(12) United States Patent
Rogers

(10) Patent No.: US 10,668,582 B1
(45) Date of Patent: Jun. 2, 2020

(54) METHOD AND APPARATUS FOR PRECISE INSTALLATION OF ELECTRICAL AND DATA TRANSMISSION OUTLET BOXES

(71) Applicant: Noris G. Rogers, Houston, TX (US)

(72) Inventor: Noris G. Rogers, Houston, TX (US)

( * ) Notice: Subject to any disclaimer, the term of this patent is extended or adjusted under 35 U.S.C. 154(b) by 0 days.

(21) Appl. No.: 16/784,227

(22) Filed: Feb. 6, 2020

(51) Int. Cl.
*G01B 5/14* (2006.01)
*B23P 19/04* (2006.01)
*B25B 5/02* (2006.01)

(52) U.S. Cl.
CPC ............. *B23P 19/04* (2013.01); *B25B 5/02* (2013.01)

(58) Field of Classification Search
CPC ....................................................... B25H 7/00
USPC .................................................... 33/528, 562
See application file for complete search history.

(56) References Cited

U.S. PATENT DOCUMENTS

| 3,436,070 | A | * | 4/1969 | Sanson | H02G 3/125 269/8 |
|---|---|---|---|---|---|
| 3,522,658 | A | | 8/1970 | Howell | |
| 3,751,026 | A | | 8/1973 | Stickney | |
| 3,859,002 | A | | 1/1975 | Sauey | |
| 3,875,669 | A | | 4/1975 | Hull | |
| 4,850,115 | A | | 7/1989 | Price et al. | |
| 5,222,303 | A | * | 6/1993 | Jardine | G01B 3/02 33/528 |
| 5,361,509 | A | | 11/1994 | Wheeler, Sr. et al. | |
| 5,423,499 | A | | 6/1995 | Webb | |
| 5,860,219 | A | * | 1/1999 | Wilkinson | H02G 1/00 33/528 |
| 5,992,036 | A | | 11/1999 | Cannelli, Jr. | |
| 6,434,848 | B1 | | 8/2002 | Gordon et al. | |
| 6,944,964 | B1 | * | 9/2005 | Easter | G01B 3/14 33/528 |
| 6,966,119 | B1 | * | 11/2005 | Dlugoleski | G01C 9/26 33/194 |
| 7,271,335 | B2 | | 9/2007 | Dinh | |
| 7,434,326 | B2 | | 10/2008 | Gifford | |
| 7,454,844 | B1 | | 11/2008 | Ruby | |
| 7,592,542 | B1 | | 9/2009 | Gerardo | |
| D807,211 | S | | 1/2018 | Nikayin et al. | |
| 2004/0049933 | A1 | * | 3/2004 | Hicks | H02G 1/00 33/528 |
| 2004/0083617 | A1 | * | 5/2004 | Bielen | H01R 13/748 33/528 |
| 2006/0265893 | A1 | * | 11/2006 | Gifford | H02G 3/126 33/528 |

(Continued)

*Primary Examiner* — George B Bennett
(74) *Attorney, Agent, or Firm* — Karen B. Tripp

(57) ABSTRACT

A tool and method of using the tool for positioning electrical outlet boxes and data transmission outlet boxes for installation behind or within walls during construction or renovation of commercial buildings. The tool can be used to install one, two or three electrical outlet boxes at a desired wall height and horizontal spacing from a wall stud with efficiency, ease and precision. With the tool, the outlet boxes can be accurately installed at heights ranging from twelve to fifty two inches, and even as high as eighty inches above the floor. The tool provides a beveled edge template for the marking of a single gang or two gang outlet on a sheetrock wall, affording accuracy in tracing and then cutting of the holes needed to install the outlet boxes. The tool also can fit within a sheet metal floor track, and stands vertically in flush contact with the sheetrock wall.

8 Claims, 4 Drawing Sheets

(56) References Cited

U.S. PATENT DOCUMENTS

| | | |
|---|---|---|
| 2007/0277388 A1* | 12/2007 | Murphy ................. H02G 3/123 33/528 |
| 2009/0277029 A1* | 11/2009 | Guzallis ................. H02G 1/00 33/528 |
| 2010/0037475 A1* | 2/2010 | Guzallis ................. H02G 1/00 33/528 |
| 2010/0095543 A1 | 4/2010 | Inthavong |
| 2011/0140331 A1 | 6/2011 | Masiongale |
| 2018/0292241 A1* | 10/2018 | Majeau ................... G01D 7/00 |
| 2019/0230811 A1* | 7/2019 | Geng ...................... B25H 7/00 |

* cited by examiner

METHOD AND APPARATUS FOR PRECISE INSTALLATION OF ELECTRICAL AND DATA TRANSMISSION OUTLET BOXES

BACKGROUND

1. Field

The invention generally relates to apparatuses or tools for marking locations on walls for installation of electrical, coaxial cable, and other data transmission outlet boxes during construction or remodeling of buildings.

2. Description of Relevant Art

In building construction, electrical work typically includes installation of electrical and data transmission outlet boxes, with supports and related components hidden within walls which are usually comprised of sheetrock. Installation procedures for the outlet boxes can differ depending on whether the wall studs are made of wood or metal and whether the building is intended for residential or commercial purposes.

In residential construction, the studs are usually comprised of wood, and for interior walls, sheetrock is installed on both front and back sides of the studs before the outlets are positioned and installed between the studs and in-between the sheetrock on the front and back sides of the studs. However in commercial construction, studs are usually comprised of metal, and for interior walls, sheetrock is first positioned on only one side (front side) of the studs for a first side of the interior wall and outlet boxes are then located on the back side of that first sheetrock, before sheetrock is positioned over the other side (back or opposite side) of the studs for a second side of the interior wall. Before sheetrock is positioned over this other side for a second side of the interior wall, the back side of the first sheetrock is called the "open"side, and the wall at this stage of construction is called an "open wall."

An outlet marker or installer, such as an electrician or electrician's helper for example, stands on the open side and marks the location for installation of outlets that are to be accessible from the front side of that first side of the interior wall, and also marks the location for outlets that are to be accessible from the front side of the second side of the interior wall once the wall is "closed," that is, after sheetrock is later positioned over the back side of the studs.

For positioning outlet boxes to be accessible from the front side of the first side of the wall, the outlet marker or installer determines the desired location for the outlet box in relation to the sheetrock wall, and then using a pencil or other marker, traces out the appropriate lines for cutting an opening through that sheetrock to make the outlet accessible through the sheetrock from the first side of the wall.

Before cutting any holes in the sheetrock for outlets, installers commonly use a tape measure or yardstick to ascertain the correct height for the boxes to be installed and a tape measure and a straight edge to mark and then trace out a typical two inch by four inch rectangle on the back side of the sheetrock for cutting holes in the sheetrock for accessing outlets from the first side of the wall A number of different apparatuses and methods have been offered and used in an effort to make such placement or positioning of outlet boxes easier, more efficient, and more precise, but only to varying degrees of success. For example, one approach has been to cut a stick to a proper length and then use it to consistently position outlet boxes at a desired height on a wall. This approach, like the method described above using a tape measure or yardstick, has utility for mounting an outlet box at a particular height on the open side of a sheetrock wall, but neither method provides a solution or aid for tracing a two inch by four inch rectangle for precise cutting a hole through the first side of the sheetrock wall for access to an outlet from that side.

U.S. Pat. No. 5,361,509A, issued Nov. 8, 1994, to Wheeler, Sr., et al. teaches an "Electrical Box Installation Tool," for "holding electrical boxes in position for attachment to studs in residential and commercial building construction." However, that device does not provide any solution for cutting rectangular holes in the sheetrock, for access to outlet boxes installed behind a first side of an interior wall.

U.S. Pat. No. 6,434,848B1, issued Aug. 20, 2002 to Gordon et al., provides a "Template for Scribing Electrical Box Openings for Old Work," but it does not provide any solution for installing electrical outlet boxes at desired locations on an open sheetrock wall, left open or one sided for the electrical rough-in phase of the work.

U.S. Design Pat. No. D807211, issued Jan. 9, 2018, to Nikayin et al. discloses an "Adjustable Height Gauge for Installing Electrical Box," an ornamental design for an adjustable height gauge with a ledge for setting an electrical box height for installation from zero inches to twenty one inches from the floor. That device does not show or suggest a solution for tracing out a two inch by four inch rectangle on sheetrock for cutting a hole for installation of an electrical outlet box that will be facing toward the first side of the wall (that is, that will be accessible from the first side of the wall).

There continues to be a need for a tool that will aid an electrician, an electrician's helper, or other outlet box installer to easily, efficiently, and precisely install outlet boxes in commercial buildings to specific heights, or along the interior or unfinished side of a sheetrock wall and also to accurately trace out individual or multiple two inch by four inch rectangles for marking and positioning the placement of holes for installing outlet boxes that will face toward the other side of the sheetrock wall for ultimate access from the first side of that sheetrock wall.

SUMMARY

The present invention provides a tool and a method of using that tool for improving the efficiency and accuracy or precision of installing outlet boxes on or behind walls during building construction or renovation. The tool comprises an adjustable, extendable, and fixable height guide as well as a beveled edge template for accurately marking the position for cutting sheetrock for outlet box installation. The tool fits flush against a wall or other contact area for more precise measurement and template placement. The tool also has a recess or channel within the bottom or base of its support that not only allows such base to rest level or evenly on a floor or other horizontal surface, but also avoids disruption of that evenness by objects protruding out of the floor, such as for example nail heads along a floor track.

BRIEF DESCRIPTION OF THE DRAWINGS

The present invention will be better understood by referring to the following detailed description of preferred embodiments and the drawings referenced therein, in which.

DETAILED DESCRIPTION

Referring generally to the Figures, the present invention provides an apparatus or tool to assist an outlet box installer to easily, efficiently, and precisely install outlet boxes in buildings at specific or desired heights. The advantages of the invention are particularly appreciated in the construction of commercial buildings and in the placement of outlets along open walls. The apparatus of the invention affords accurate tracing of individual or multiple two inch by four inch rectangles for designating the placement of holes for installing outlet boxes that will face toward the closed or finished side of the sheetrock wall for ultimate access to the outlets from that first side of the sheetrock wall.

Figure 1:
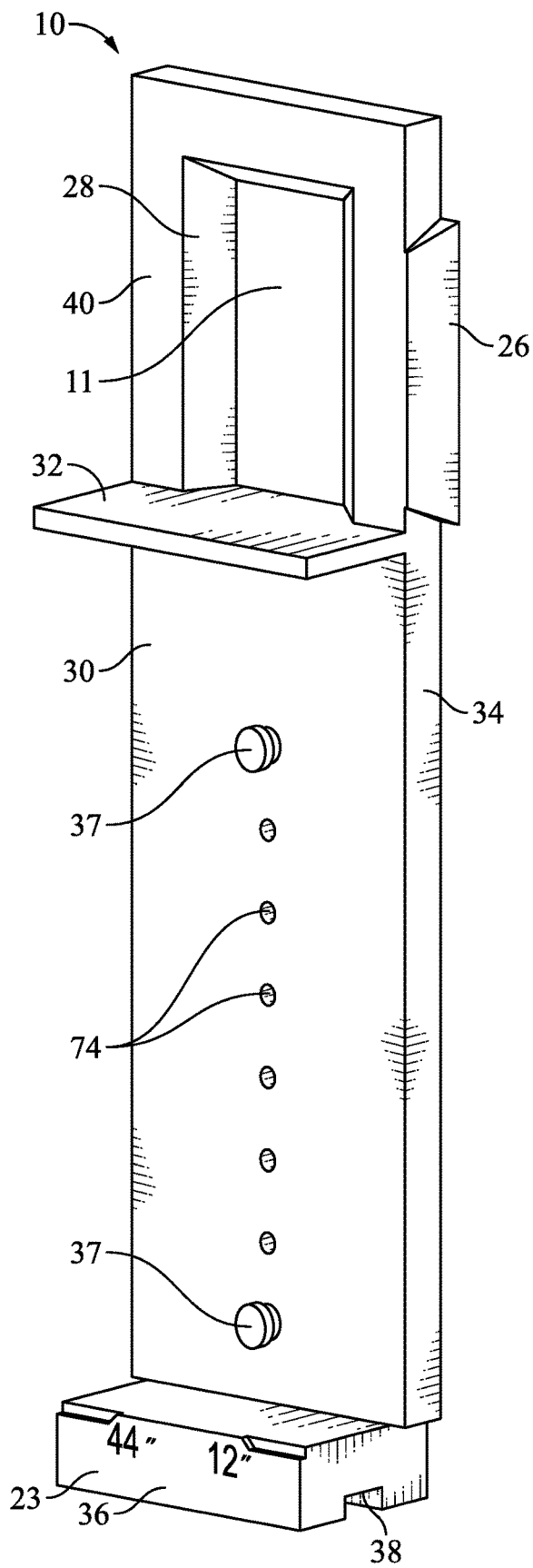
FIG. 1 is a front, perspective view of one embodiment of the apparatus of the invention.

In FIG. 1, one embodiment of tool 10 of the apparatus of the invention has a slidable panel 30 which has a template 40 with an opening 11 for tracing a rectangle to designate placement of a single gang outlet. The template 40 preferably has beveled edges 28 around the opening 11 as shown to facilitate accurate tracing. To the side of the template 40 is an extender 26 to facilitate use of template 40 for tracing a rectangle to designate placement of a two gang outlet. That is, in tracing opening 11 in template 40 for a two gang outlet, the extender 26 is used instead of the side of the opening 11 to which the extender 26 is adjacent. Thus, for a two gang outlet, one traces along beveled edges 28 at the top, left and bottom sides of the opening 11, plus along the outer edge of the extender 26. Although in this embodiment extender 26 is on the right side 34 of template 40, in an alternative embodiment it could be positioned instead on the left side 33 of template 40, in which case one would trace along the outer edge of extender 26 instead of the left side 33 of the opening 11 and one would trace along the right side of the opening 11.

Figure 3:
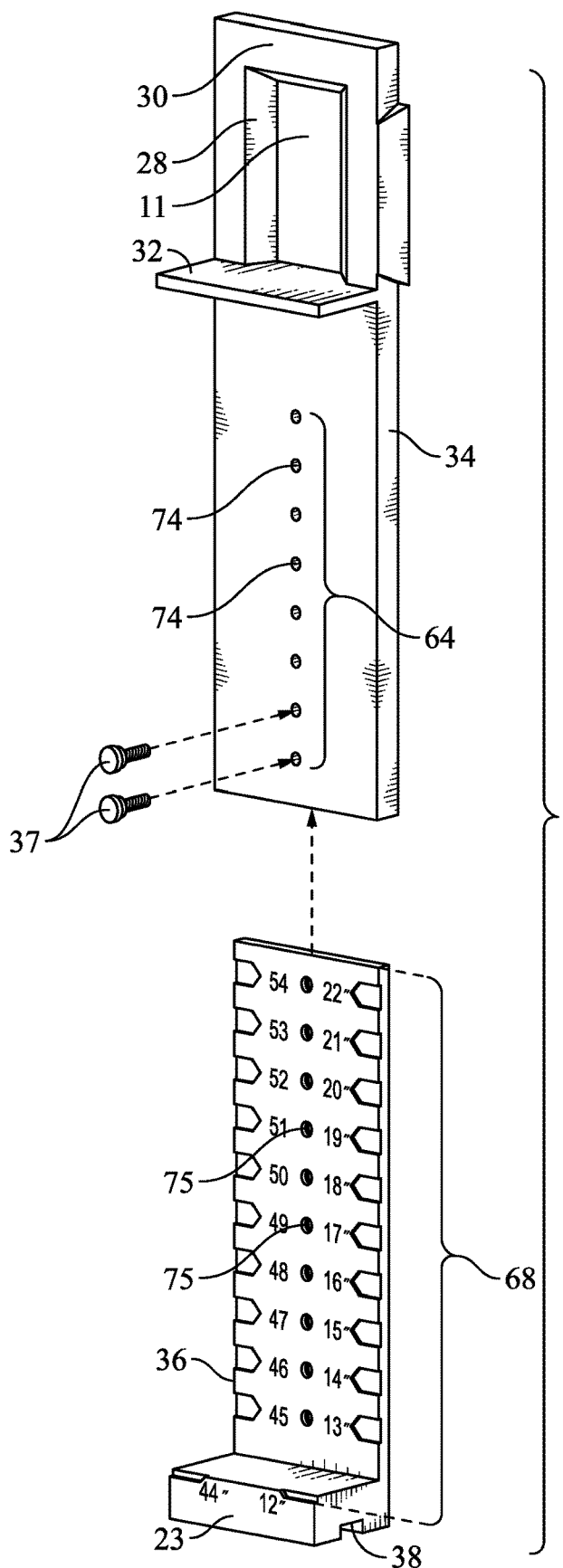
FIG. 3 is an exploded view of the apparatus of FIG. 1.
Figure 4:
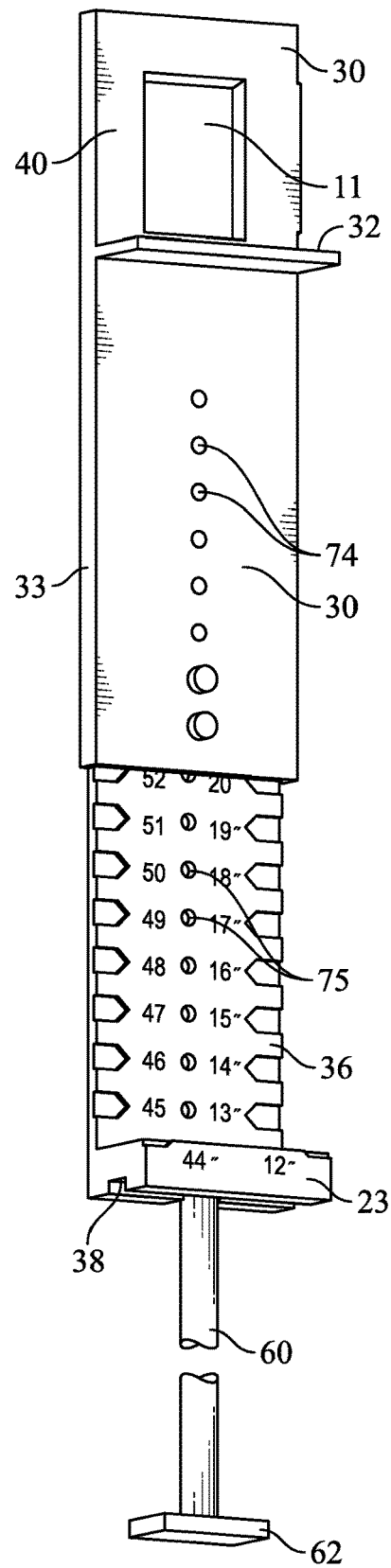
FIG. 4 is a front, perspective view of the apparatus of FIG. 2.
Figure 5:
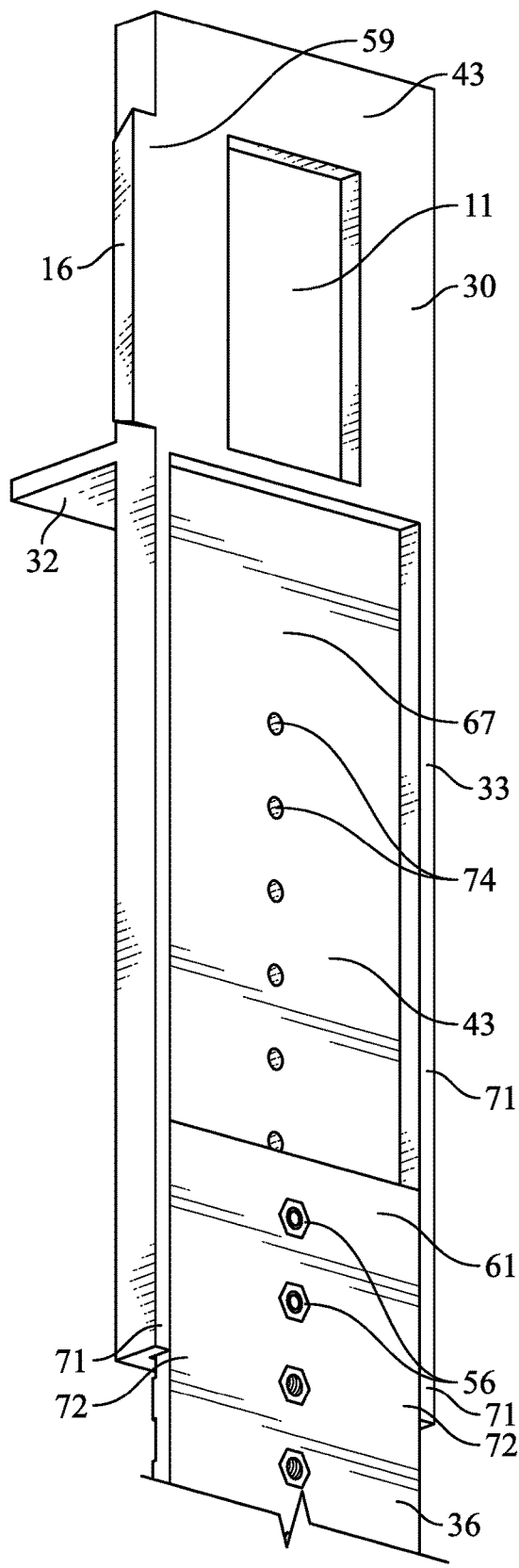
FIG. 5 is a rear or back perspective view of the apparatus of FIG. 1. Please note that any apparent distortion seen upon viewing this drawing is due to the angle shown in this isometric projection, and if seen, might be alleviated by viewing the drawing upside down.
Figure 7:
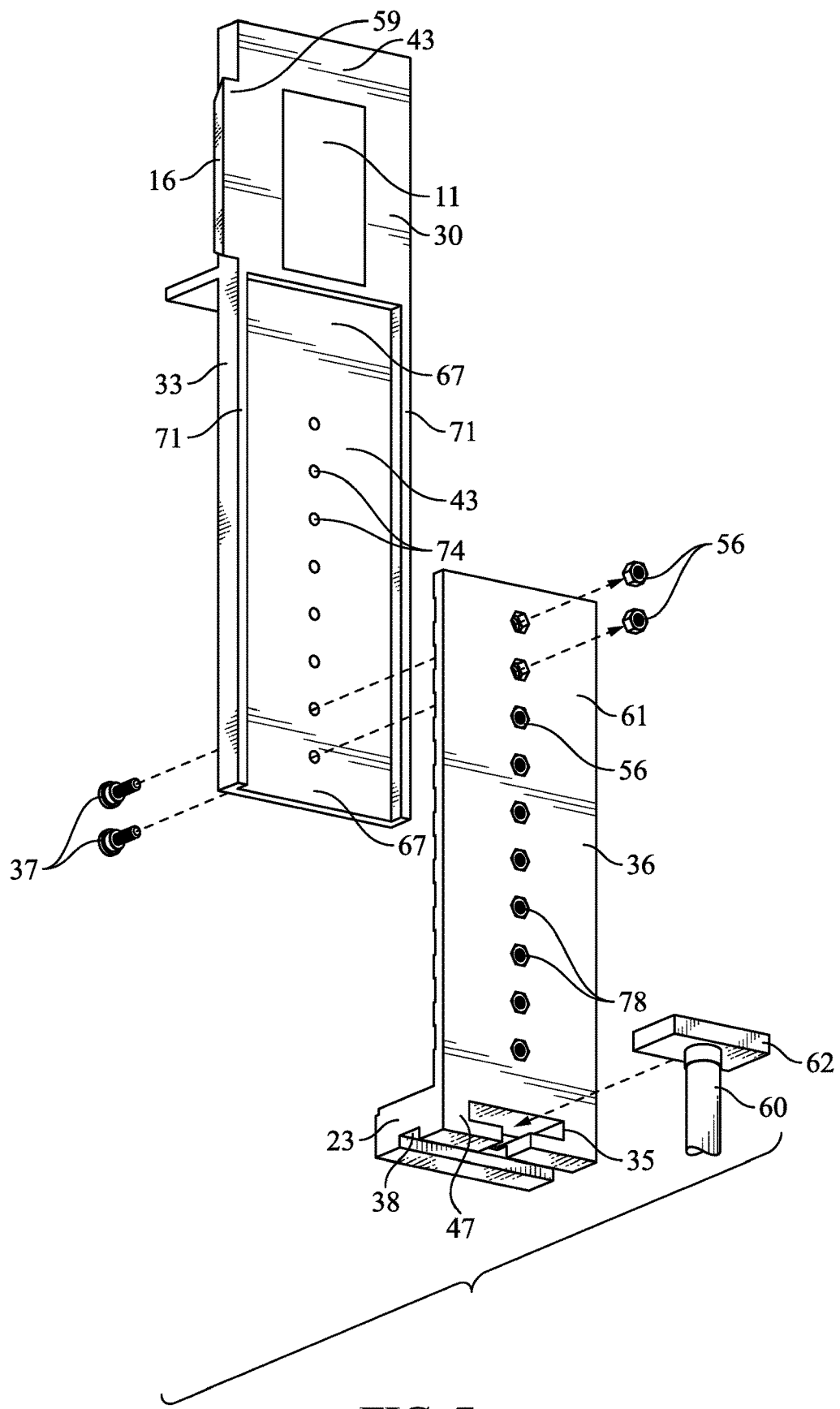
FIG. 7 is an exploded view of the apparatus of FIG. 5. Please note that any apparent distortion seen upon viewing this drawing is due to the angle shown in this isometric projection, and if seen, might be alleviated by viewing the drawing upside down.

Slidable panel 30 fits onto and over support 36, shown in more detail in FIGS. 3, 5, and 7, so that the recessed back section 67 of slidable panel 30 which receives support 36 can slide up and down in relation to support 36. In some embodiments, slidable panel 30 is 5⅛ inches in width, which is a size that most easily facilitates precise installation of standard sized electrical outlet boxes (which are 4 inches by 4 inches in length and width), that is, the size that most easily enables installation in the exact location desired.

Figure 2:
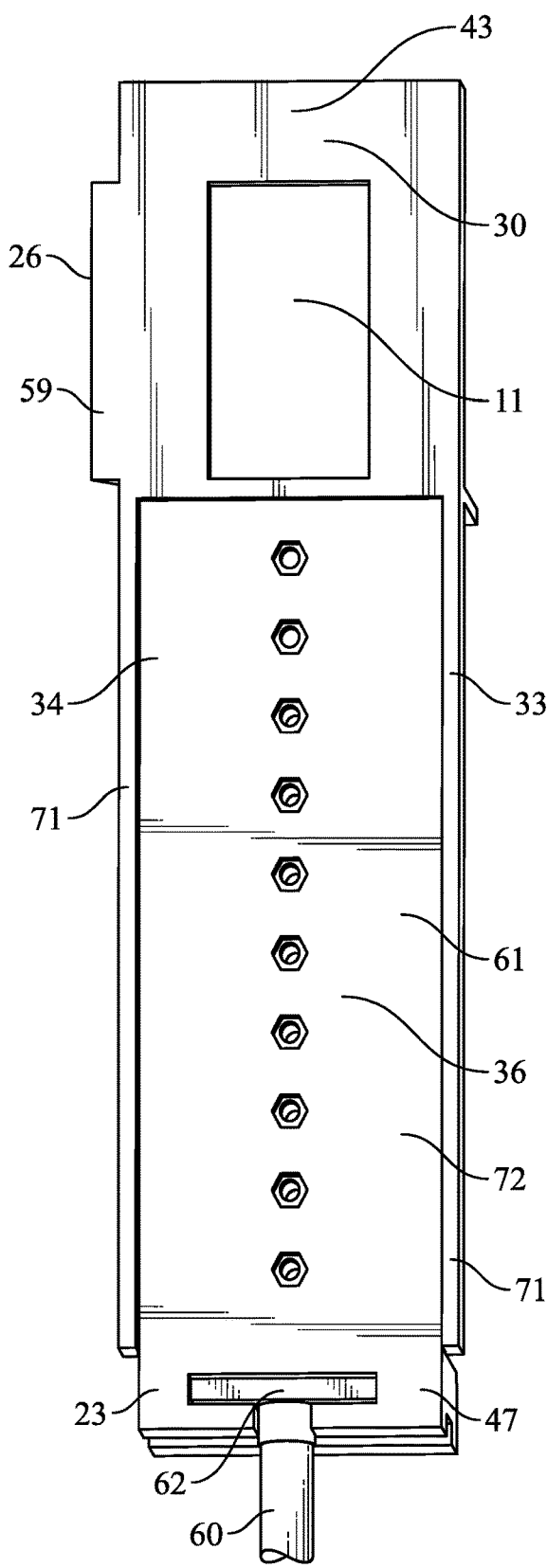
FIG. 2 is a rear or back view of the embodiment of the apparatus shown in FIG. 1, with an extender leg attached thereto.

FIGS. 2, 5 and 7 illustrate the back of tool 10, including back 43 of template 40 of slidable panel 30, which has a recessed back section 67. Opening 11 of template 40 is visible, and back 59 of extender element 16 is visible. Also shown is back 61 of support 36 and back 47 of support base 23. When support 36 is inserted in the recessed back section 67 of slidable panel 30, and within the sides 33 and 34 of slidable panel 30, the outer surface 72 of back 61 is flush with the back surface 71 of sides 33 and 34, such that the support 36 does not prevent the back 43 from laying flat or flush against a wall (not shown), so that the edge of back 43 around opening 12 is flat and flush against a flat surface such as a wall to enable even and accurate tracing when using template 40.

Support 36 is held to slidable panel 30 by at least two removable connectors positioned through both support 36 and slidable panel 30 and secured. For example bolts 37 shown in FIG. 3, are positioned through holes 74 in slidable panel 30 and holes 75 in support 36 and secured with nuts 56. The connectors are removable so the slidable panel 30 can be adjusted on the support 36, that is, moved up or down to make the tool 10 longer/taller or shorter as desired, which will be discussed further below.

FIGS. 2, 4, 6 and 7 show an embodiment of the invention with an extended leg 60 attached (preferably removably attached) to the support 36 through insertion of leg connection platform 62 into open slots 35 and 38 in the bottom of base 23. Although only the top portion of the extended leg 60 is shown in these Figures, extended leg 60 in some embodiments has a foot (not shown) at the lower end for sitting extended leg 60 on a floor (not shown) to hold the apparatus upright for use. Alternatively, extended leg 60 can be hand held or propped.

Referring to FIG. 3, ledge 32, which is useful in holding or propping an outlet box to be installed or for resting one's hand while tracing around template 11, is positioned below template 11. On right side 34 of slidable panel 30, and below and adjacent the bottom of slidable panel 30 is support 36, which includes the open slot 38. Slidable panel 30 connector or bolt holes 74 (in panel group 64) are positioned in slidable panel 30 to correspond to connector or bolt holes 75 in support 36. The vertical position of slidable panel 30 in relation to the support 36 can be changed by removing the connectors or threaded bolts 37 and then positioning the slidable panel 30 in relation to the support 36 at the desired height for electrical box installation, using the height indicators 68, so that the slidable panel 30 will then be at the correct vertical position in relation to the support 36, for the installation of outlet boxes at that specific height from the floor.

Support 36 has two vertical rows of height indicators 68; with one side (in FIG. 3, the right side) of the height indicators 68 numbered from twelve inches to twenty inches, and the other side (in FIG. 3, the left side) of the height indicators 68 numbered from forty four inches to fifty two inches. These numbers correspond to distance from the floor that the template 11 will be and thus that the outlet box to be installed will be. The right column of numbers, that is, the column of smaller numbers, measures distance when base 23 rests on the floor. The left column of numbers, that is, the larger column of numbers measures distance when extender leg 60 (shown in FIGS. 2, 4, 6 and 7, is attached and the end or foot (not shown) of extender leg 60 rests on the floor. Thus, the embodiment of the tool of the invention shown in the Figures can be used for installation of outlet boxes to be positioned at heights ranging from twelve inches to twenty inches above the floor, and ranging from forty-four inches to fifty-two inches above the floor. Other height indicators could be used for other ranges. Movement of support 36 up and down within slidable panel 30 allows for adjustment of the tool for the desired heights for the installation of outlet boxes at the desired distance from the floor.

Figure 6:
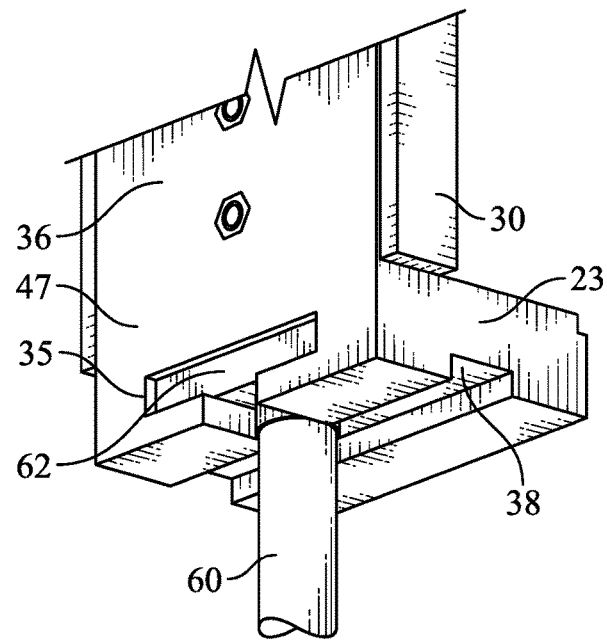
FIG. 6 is a close up, bottom perspective view of the support portion of the apparatus of FIG. 1. Please note that any apparent distortion seen upon viewing this drawing is due to the angle shown in this isometric projection, and if seen, might be alleviated by viewing the drawing upside down.

FIG. 6 shows am enlarged and more detailed view of bottom 23 of support 36, where the extender leg 60, using the extender leg base 62, is attached to the support 36. Also shown is the open slot 38 in bottom 23, which allows support 36 to be placed in a vertical position in a metal floor track (not shown), and remain there without making physical contact with any nail heads that typically protrude from such floor track or floor, nails having been used to attach the metal floor track to the floor, which is at this stage of construction usually comprised of concrete floor.

To install an outlet box which will face into the room where the outlet box installer is standing, which is at the time of installation on the open side, that is, the second side, of the one-sided, or open, wall, an outlet box installer will first determine the correct height the outlet box should be mounted. If that height is twelve inches from the floor, then the tool 10 will be adjusted to the twelve inch mark—which is where the slidable panel 30 is at its lowest position in relation to the support 36, as seen in the embodiment shown in FIG. 1. The slidable panel 30 is then secured to the support 36 using connectors, which in the embodiment shown in the Figures are, for example, at least two threaded bolts 37, which will be inserted into the slidable panel bolt holes 64 (as seen in FIG. 3) and tightened into embedded hex nuts 56 (as shown in FIG. 5).

If some other height such as, for example, twenty inches from the floor, is required for the installation of the outlet boxes, then the tool 10 will be adjusted to the twenty inch mark (as shown in FIG. 3); by removing the threaded bolts 37, and then repositioning the slidable panel 30 in relation to the support 36, such that the bottom of the slidable panel 30 will then be positioned at the twenty inch indicator mark on the front right side 34 of the support 36 (using the height indicators 68 for reference).

Regardless the position the slidable panel 30 is in with relation to the support 36, there should preferably be at least two connectors, i.e., in this embodiment, threaded bolts 37, tightened into embedded hex nuts 56 as shown in FIGS. 5 and 7, preferably spaced as far away from each other as possible, to maintain maximum rigid contact and proper alignment between the slidable panel 30 and the support 36.

In commercial construction where metal studs are used and floor tracks mark the locations for placement of walls, after the slidable panel 30 is adjusted to the desired height, the outlet box installer then places the tool 10 in an upright vertical position, with the support 36 situated inside of the floor track. Resting the edge of tool 10 without the extender 26, that is, with respect to the Figures, resting the left edge of tool 10 against the right side of a metal stud, then causes the single gang template 11, or the two gang template through use of extender 26, to be positioned at the correct distance from the stud, such that an outlet box with an industry standard bracket attached on the left side of that outlet box, can be placed on ledge 32 for attachment to the stud, using typical tools such as a screw gun and appropriate sheet metal screws.

To install an outlet box that will be positioned facing into the adjacent room on the other side, that is, the first side of the one-sided or open sheetrock wall, the outlet box installer will position the back 43 of tool 10 flush against the inside surface, that is, the second side, of the one-sided or open sheetrock wall. The "left" edge of the tool 10 (that is, the edge or side opposite the extender 26, which in the Figures is the "left" side looking at FIG. 1), is positioned immediately adjacent to the right side of the selected metal stud. Next, using a carpenter's pencil or other suitable marking instrument, either single gang or two gang rectangular markings are traced on the sheetrock, using either the single gang template 11 or the two gang extender 26 with template 11, as the guide for making those markings on the sheetrock.

Additionally as seen in FIG. 1, the beveled edges 28 of the single gang template 11 and of the extender 26 allow the markings on the sheet rock wall to be drawn more precisely—as the beveled edge 28 will allow the pencil to remain at the optimal angle while drawing the markings on the sheet rock, thus ensuring that the writing tip of the pencil will remain in firm contact with the sheetrock, directly at the outer edge of the single gang template 11 or the extender 26 for the two gang template, thus ensuring an accurate marking as needed for the cutting of the holes in the sheet rock, to install the outlet boxes.

In cases where three outlet boxes that will be installed between two studs, the outlet box installer will use the width of tool 10 to evenly space the three device boxes between the studs. This process is accomplished by placing tool 10 flush against the sheetrock wall and tracing template 11 in the desired position for the first outlet box and also drawing a vertical line on the sheetrock along edge 34 of tool 10 from ledge 32 downward. Tool 10 is then moved to the right so that the left edge of the tool 10 will then be positioned on that vertical line which was just drawn on the sheetrock, and then the second rectangular template can be used in tracing a position for the second outlet box with the tool 10 in a vertical position flush against the sheetrock wall. This process is repeated for the third rectangular template—resulting in three device boxes installed at the same exact height and correctly spaced in relation to each other and in relation to the selected stud.

While preferred embodiments of the present disclosure have been described, it should be understood that other various changes, adaptations, and modifications can be made therein without departing from the spirit of the invention(s) and the scope of the appended claims. The scope of the present disclosure should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed.

What is claimed is:

1. An apparatus or tool for reducing installation time and improving installation precision of electrical or data transmission outlet boxes in or behind walls during building construction or remodeling using a metal framing system, where the walls are constructed on or adjacent to metal floor track at least partially held in place on the building floor or foundation with floor anchors or other floor track connectors, the tool comprising:

a support having a bottom or foot sized to fit within or rest on the metal floor track and having an open slot for clearance of any floor anchors or other floor track connectors within or on the floor track;

a slidable panel with a template for a single gang trace, and adaptable for a two gang trace, for positioning the outlet box, and with a recessed back portion for slidably receiving the support in a flush configuration so that the back of the template can be positioned flush against a wall;

at least two connectors for holding the panel and the support together in said flush configuration; and a ledge extending outwardly beneath the front of the template and of sufficient size to hold an outlet box;

wherein the support has markings thereon for measuring distance of the slidable panel or the template on the slidable panel from the metal floor track, so that the slidable panel can be fixedly but removably positioned along the support to place the template at a desired location for tracing a desired outlet location on the wall.

2. The tool of claim 1, wherein the distance between the outer edges of said support and the inner edges of said recessed area in said slidable panel is limited as to provide nearly a zero tolerance fit.

3. The tool of claim 1, further comprising an extension member attached to the bottom of said support.

4. The tool of claim 3 wherein said support has a base comprising a channel for receiving said extension member, and when said extension member is not attached, for overlaying any obstructions on said floor to facilitate the tool resting level on the floor.

5. The tool of claim 4, wherein:
said support comprises numerical markings to indicate the vertical height of the template above the floor; and said numerical markings are comprised of a first and a second vertical column of numerical digits, with the first column indicating the height of said template above the floor without said extension leg attached, and the second column indicating the height of said template above the floor when said extension member is attached.

6. A method for installing electrical outlet and data transmission outlet boxes on or behind an open sheetrock wall, the method comprising:

placing the tool of claim 1 flush against said wall, with the edge of said tool that is proximal to a stud positioned adjacent to the proximal side of said stud;

marking the wall using said template in said slidable panel, to indicate the correct vertical and horizontal position for installation of an electrical box in the wall, in relation to said stud.

7. The method of claim 6, further comprising cutting a hole for an outlet box along the marking on the wall.

8. The method of claim 7, further comprising installing said outlet box through said hole.

* * * * *